United States Patent [19]

Radwan et al.

[11] Patent Number: 4,855,851
[45] Date of Patent: Aug. 8, 1989

[54] HEAD SUSPENSION FOR MAGNETIC RECORDING

[75] Inventors: Hatem R. Radwan, Eden Prairie; Lloyd C. Goss, Bloomington, both of Minn.

[73] Assignee: Magnetic Peripherals Inc., Minneapolis, Minn.

[21] Appl. No.: 162,950

[22] Filed: Mar. 2, 1988

[51] Int. Cl.⁴ ............................................. G11B 5/48
[52] U.S. Cl. ................................... 360/104; 360/106
[58] Field of Search ............... 360/104, 105, 106, 109

[56] References Cited

U.S. PATENT DOCUMENTS

| | | | |
|---|---|---|---|
| 3,774,183 | 11/1973 | Roscamp | 360/104 |
| 3,864,748 | 2/1975 | Herdman et al. | 360/102 |
| 3,931,641 | 1/1978 | Watrous | 360/104 |
| 3,956,770 | 5/1976 | McWhinnie et al. | 360/103 |
| 4,204,235 | 5/1980 | Stollorz | 360/103 |
| 4,268,879 | 5/1981 | Watrous | 360/104 |
| 4,286,297 | 8/1981 | Root et al. | 360/103 |
| 4,291,350 | 9/1981 | King et al. | 360/104 |
| 4,306,258 | 12/1981 | Higashiyama et al. | 360/104 |
| 4,328,521 | 5/1982 | Pexton et al. | 360/104 |
| 4,363,045 | 12/1982 | Herman | 360/104 |
| 4,389,688 | 6/1983 | Higashiyama | 360/104 |
| 4,399,476 | 8/1983 | King | 360/104 |
| 4,433,352 | 2/1984 | De Marco et al. | 360/105 |
| 4,625,249 | 11/1986 | Iwata | 360/104 |
| 4,630,158 | 12/1986 | Spash | 360/105 |
| 4,724,500 | 2/1988 | Dalziel | 360/104 |

Primary Examiner—Stuart N. Hecker
Assistant Examiner—David J. Severin
Attorney, Agent, or Firm—Edward P. Heller, III; Frederick W. Niebuhr; Robert M. Angus

[57] ABSTRACT

A suspension is provided for supporting a magnetic transducing head with respect to a carriage, for movement with the carriage and relative to a substantially planar magnetic recording surface. Two parallel and spaced apart flexure arms extend from the carriage, and are extremely thin in the dimension perpendicular to the recording surface. The remote ends of the flexure arms are joined by an elongate rigid cross-bar directed transversely of the arms. The transducing head is fixed to the cross-bar, intermediate the flexure arms. When the recording surface is moved, an air bearing between the recording surface and head stabilizes the head, and the flexure arms are constrained to behave as elastic beams fixed at both ends. In particular, the flexure arms are subject to lengthwise torsional bending, and pure bending about axes parallel to the cross-bar, enabling the head/cross-bar assembly to respond in gimbal fashion to recording surface irregularities.

17 Claims, 2 Drawing Sheets

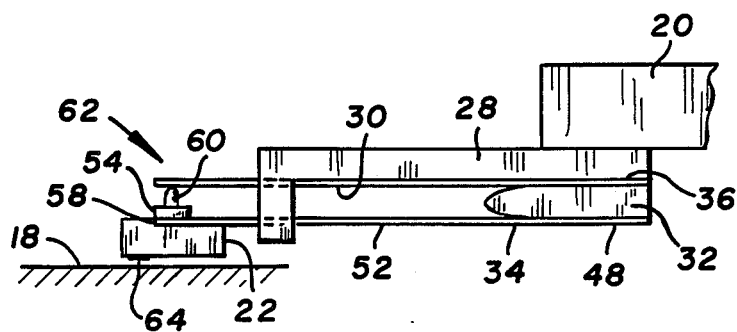
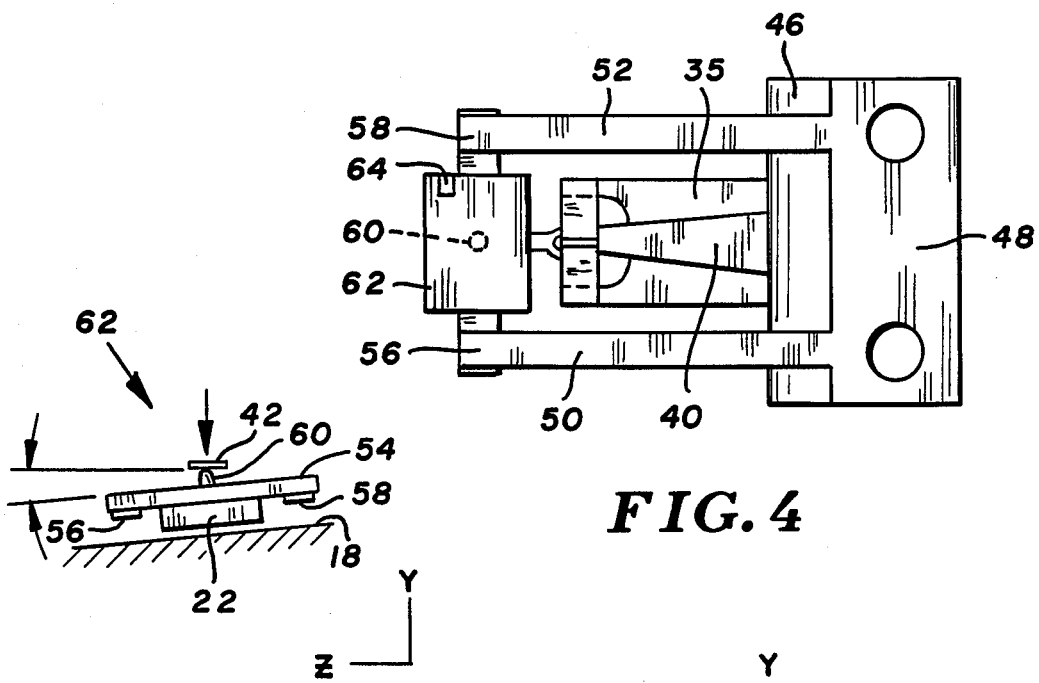
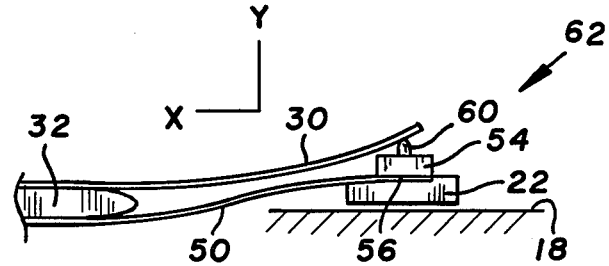
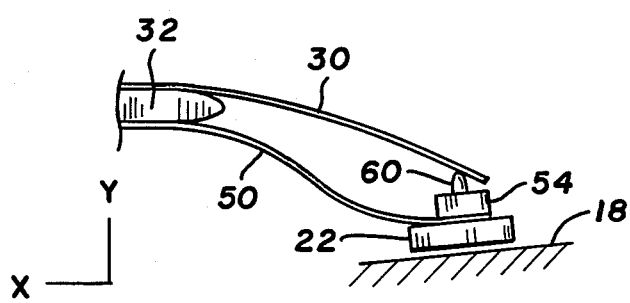

HEAD SUSPENSION FOR MAGNETIC RECORDING

BACKGROUND OF THE INVENTION

This invention relates to reading and recording magnetic data, and more particularly to apparatus for supporting a magnetic transducing head with respect to a rigid carriage in a manner that permits the head to respond to slight surface irregularities in a substantially planar magnetic recording surface.

It is known in the art to support magnetic transducing heads to facilitate gimbaling action, i.e. tilting about axes parallel to a magnetic recording surface and perpendicular to each other, and moving linearly or along an arc parallel to the recording surface plane. For example, U.S. Pat. No. 4,328,521 (Pexton) discloses a gimbal spring with a pair of opposing legs, a ring, and a platform within the ring. Transverse bands between the arms and outer ring, and longitudinal bands between the outer ring and gimbal platform, cooperate to allow tilting, with the legs sufficiently flexible to permit the required linear movement. A load arm biases the head toward the recording surface. This or other gimbal springs are employed with heads that contact the recording surface, or with heads that "fly" parallel to and spaced apart from the recording surface, supported by a bearing or cushion of air. The freedom for gimbaling movements is particularly important in connection with flying heads, as it allows head positioning close to the recording surface while minimizing the chance for a head crash, i.e. an unintended, often damaging contact of the head and recording surface.

Transducing head suspensions have competing needs. First, a suspension should be flexible, to permit rapid response to recording surface irregularities. However, for more accurate head positioning and improved dynamic performance, the resonant frequency of the support system should be high, and this calls for high stiffness. Typically, these competing needs are balanced by providing three separate components in a head suspension system: a highly flexible gimbal component; somewhat less flexible support arms; and a comparatively rigid but still elastic load spring.

Further examples of suspension systems include one in U.S. Pat. No. 4,286,297 (Root) having two relatively rigid tapered legs, with flexible sections at opposite ends of the legs. Consequently, when the slider is loaded near the recording surface, both flexible ends bend, at least in theory, to maintain the slider parallel to the disc surface. A boss directly aligned with the head is loaded through a movable lid 40. U.S. Pat. No. 3,931,641 (Watrous) shows a flexure for mounting an air bearing slider including relatively thin flexible longitudinal fingers joined by cross-legs which are stiffer than the fingers due to their greater width. A loading force is applied by a load beam, acting on a protuberance 40 above the head.

U.S. Pat. No. 3,864,748 (Herdman) shows an attitude spring and a load spring, both flat, horizontally disposed and spaced apart from one another. A flexible cross-member joins opposed longitudinal arms of the attitude spring. While each of the above examples is satisfactory to a degree, all are complex and difficult to control accurately in production, and necessarily involve a compromise between the desired high resonant frequency and rapid gimbaling response.

Therefore, it is an object of the present invention to provide a simplified, and more reliable and consistent magnetic head suspension.

Another object of the invention is to achieve improved dynamic performance by reducing off-track motions of a transducer core, and by minimizing fluctuations in flying height.

Another object is to employ the air bearing of a flying head in connection with the head suspension, to substantially increase the resonant frequency of the suspension.

Another object of the invention is to provide a head suspension system in which a single flat component provides positioning of the head and also provides gimbaling action, without bends or curves formed into it.

Yet another object of the invention is to provide a preformed load spring designed to be nominally flat during operation, thereby minimizing its vibration.

SUMMARY OF THE INVENTION

To achieve these and other objects, there is provided a suspension apparatus for supporting a magnetic transducing head with respect to a rigid carriage member for movement relative to a substantially planar magnetic recording surface of a magnetic recording medium.

The suspension apparatus includes elongate and spaced apart first and second normally planar flexure members. Each flexure member is mounted to and extends lengthwise away from a rigid carriage and normally is disposed parallel to a substantially planar recording surface of a magnetic recording medium. An elongate and substantially rigid cross-member is fixed to the first and second flexure members at respective first and second end portions of the flexure members remote from the carriage. A magnetic transducing head is integrally mounted to the cross-member and centrally disposed between the first and second end portions. A biasing means urges the cross-member and head toward the recording surface. Each of the first and second flexure members is disposed with its width dimension parallel to the recording surface and its thickness dimension substantially normal to the recording surface. The width of each flexure member is substantially greater than its thickness, whereby each flexure member is readily elastically deformable about axes parallel to its width and is subject to lengthwise torsional bending. Each flexure member, however, is substantially resistant to elastic bending about axes normal to its plane.

Preferably the flexure members are part of a unitary foil constructed of a high yield strength spring steel that also includes a base mounted with respect to the carriage. The flexure members can extend from the base parallel to one another and in a flexure plane parallel to the recording surface. The cross-member is preferably of structural ceramic or other material having a modulus of elasticity and stiffness to weight ratio significantly higher than that of spring steel, and having a thickness greater than that of the foil. Consequently, the flexure members are highly flexible and the cross-member is substantially rigid.

The light weight, rigid cross-bar and thin flexible support arms afford several advantages not available in prior art structures. Head loading and unloading is eased due to the flexibility of the arms and the accompanying low stiffness perpendicular to the recording surface, in the absence of an air bearing. During operation, the air bearing and load spring act upon the cross-bar/- head assembly to provide "fixed end" rather than "simple" support for the flexure members. This gives the head suspension a high resonance in spite of the thin, flexible flexure arms.

Through their torsional and pure bending flexibility, the flexure arms alone provide the desired gimbaling effect. Thus, separate gimbal components are not needed, and their undesirable tendency to rotate about axes normal to the recording surface is avoided. The flexure arms, having a width substantially larger than their thickness, reduce lateral off-track motions of the head. In the event of lateral off-track motions, the crossbar tends to maintain the head in the desired angular alignment by virtue of its fixed connection to the arms. The normally flat and parallel dispositions of the flexure arms and load spring, and the alignment of the support arm plane and cross-bar/head assembly center of mass, serve to further stabilize the suspension.

IN THE DRAWINGS

For a better appreciation of the above and other features and advantages, reference is made to the detailed description of the invention along with the drawings, in which:

FIG. 3 is a side elevation of the suspension apparatus in normal operation;

FIG. 4 is a bottom view of the suspension apparatus;

FIG. 5 is a front elevation of the suspension apparatus, elastically deformed due to a recording surface irregularity; and FIGS. 6 and 7 are side elevations similar to FIG. 3, showing the apparatus elastically deformed due to recording surface irregularities.

DETAILED DESCRIPTION OF THE PREFERRED EMBODIMENT

Figure 1:
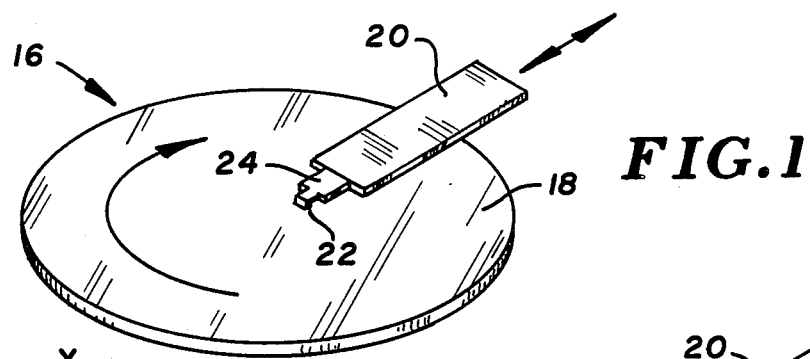
FIG. 1 is a schematic perspective view of a magnetic transducing head suspension apparatus constructed in accordance with the present invention.

Turning now to the drawings, there is shown in FIG. 1 a data recording medium, namely a rigid magnetic disc 16 rotatable about a vertical axis and having a substantially planar and horizontal magnetizable recording surface 18. A carriage 20 is supported for linear reciprocation radially of disc 16. A magnetic transducing head or slider 22 is supported by the carriage through a head suspension 24, for movement with the carriage and relative to the disc. Consequently, linear carriage movement and disc rotation enable the selective positioning of head 22 at any desired location over recording surface 18.

Preferably, head 22 is of the Winchester type, and in contact with the recording surface whenever disc 16 is at rest. But as the disc is rotated, an "air bearing" is formed by air flowing between head 22 and recording surface 18 in the direction of disc rotation, which supports the head in parallel, spaced apart relation to the recording surface.

This type of recording head, means for rotating the disc, and means for translating the carriage, are known to those skilled in the art and are not further discussed. Further, it should be recognized that the suspension device of the present apparatus could be employed in connection with other types transducing heads, other recording media, and with other types of carriages, for example rotary carriages.

Suspension 24 is provided to enable a gimbaling action of head 22 in response to irregularities in recording surface 18. The gimbaling action can be considered in terms of three mutually perpendicular directions or axes shown in FIG. 1: an X (pitch) axis radially of disc 16; a Y (yaw) axis perpendicular to the recording surface; and a Z (roll) axis tangentially of the disc. Desirable gimbaling action includes rotation about the X and Z axes, and linear reciprocating movement in the Y direction. Linear movement in the X and Z directions and rotation about the Y axis should be reduced to the extent possible. The prior art approach, of providing a separate gimbal component in addition to flexible head support arms, raises a problem in that a gimbal component flexible enough to allow rapid response in rotating about the X and Z axes, also allows undesirable rotation about the Y axis.

In accordance with the present invention, a single component of suspension 24 provides the head positioning and the gimbaling action, simplifying the suspension and substantially increasing its inherent resonant frequencies associated with appreciable off-track motion of the transducer core 64.

Figure 2:
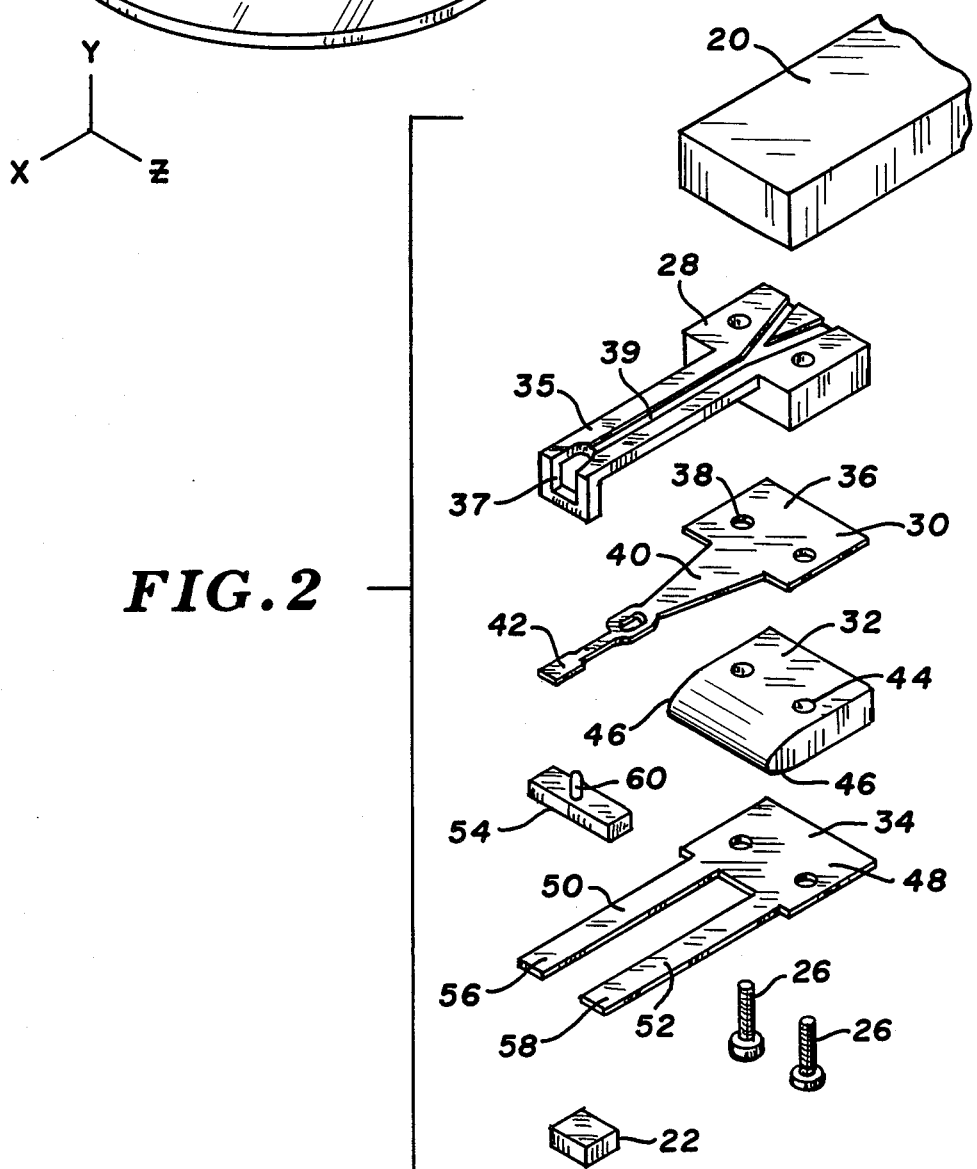
FIG. 2 is an exploded perspective view showing components of the head suspension apparatus.

In FIG. 2, suspension 24 is disassembled to better illustrate its components. A pair of screws 26, received in internally threaded openings in carriage 20, secure a spacer 28, a load spring 30, a mounting plate 32, and a flexible foil 34 to the carriage, as well as aligning these parts with the carriage and to one another. Spacer 28 a substantially rigid member, provides a predetermined spacing in the Y direction between carriage 20 and remaining components. A spacer extension 35 projects in the X direction from the carriage, and includes at its free end a containment loop 37 which surrounds a tip 42 of load spring 30 in order to limit travel of the load spring. A Y-shaped groove 39 is formed in the spacer and spacer extension for accommodating wires (not shown) between head 22 and carriage 20.

Load spring 30 is preferably constructed of a high yield strength spring steel, and includes a flat and rectangular base 36 mounted between spacer 28 and mounting plate 32. Alignment openings 38 in the base accommodate screws 26 as the load spring is clamped between the spacer and mounting plate. A medial section 40 extends from the base, tapering to a tip 42 through which the force of load spring 30 is applied to slider 22. When load spring 30 is under no external stress, medial section 40 is curved downwardly away from the horizontal plane of base 36, rather than flat as illustrated. The amount of curvature is selected to create a predetermined force or preload at tip 42 when medial section 40 is elastically deformed into a planar configuration.

Mounting plate 32 is substantially rigid and generally rectangular. Bores 44 through the mounting plate receive screws 26, which secure and align the plate. The edge of the mounting plate facing away from carriage 20 is convex or tapered as indicated at 46, to provide a smooth contour for controlling the elastic deformation of the load spring and flexible foil 34 proximate carriage 20. This also prevents kinking, particularly in thin foil 34.

Foil 34 includes a flat and rectangular base 48, and first and second parallel and spaced apart flexure arms 50 and 52 extended from the base and in the same plane as the base. Foil 34 preferably is constructed of a high yield strength spring steel. Arms 50 and 52 are shaped for high torsional and bending flexibility about axes in the X and Z directions, but also for substantial rigidity or resistance to bending about the Y axis.

A specific arrangement for the desired flexure arm behavior employs a spring steel foil with a thickness of 0.0015 inches, with the flexure arms 0.350 inches long and 0.060 inches wide. In any event, the length of each flexure arm should be at least one hundred times its thickness and its width at least twenty times its thickness. More preferably, each flexure arm is two hundred times as long, and forty times as wide, as it is thick.

A substantially rigid cross-bar 54 is fixed to remote (from carriage 20) first and second end portions 56 and 58 of flexure arms 50 and 52, respectively. Cross-bar 54 preferably is constructed of a structural ceramic material, giving it a much greater stiffness (e.g. twice the modulus of elasticity) and lighter weight (approximately half the density) of steel. As a result, the stiffness/mass ratio of the ceramic cross-bar is approximately four times the corresponding ratio for the flexure arms. In the present embodiment, cross-bar 54 has a length of 0.320 inches, a width of 0.050 inches and thickness of 0.011 inches. Consequently, cross-bar 54, particularly relative to flexure arms 50 and 52, is essentially rigid. A steel pin 60 is embedded in the top of cross-bar 54 for contact with tip 42 of the load spring, thus to receive the preload. Pin 60 has a smooth hemispherical top forming a sliding contact with the tip. Slider 22 is fixed to the cross-bar, e.g. with an adhesive, so that the slider, cross-bar and pin together form an integral slider assembly 62 (FIG. 3).

FIG. 3 shows slider 22 supported with respect to disc 16 by the carriage and suspension device. Whenever the disc is stationary, slider 22 is biased against recording surface 18 under the force of load spring 30. However, when the disc rotates, an air flow is generated between the slider and recording surface, supporting the head in a parallel, spaced apart relation to the recording surface. In terms of slider movement relative to the disc, slider 22 "flies" in the tangential or Z direction. A transducer core 64 is provided along the trailing edge of slider 22. The base of load spring 30 is clamped between spacer 28 and mounting plate 32. The thickness of the spacer is selected to position base 36 a selected distance in the Y direction from the carriage, such that the load spring is horizontal, and thus elastically deformed to store the selected preload, under normal operating conditions as shown in the figure.

Flexible foil 34 also is planar and horizontal, but much thinner and not biased or elastically loaded to store a preload. Base 48 of the foil is fastened to the mounting plate on the opposite side from the load spring by an adhesive, laser welding, or other suitable bonding means. Likewise, first and second end portions 56 and 58 of first and second flexure arms 50 and 52 are bonded to opposite ends of cross-bar 54. The planar and horizontal extension of the flexure arms results since the thickness dimension (Y direction) of the cross-bar, plus the portion of pin 60 above the cross-bar, is equal to the thickness dimension (Y direction) of mounting plate 32. The dimensions for slider 22 and cross-bar 54 are selected so that the center of mass of slider assembly 62 is within the plane of foil 34. The bottom view in FIG. 4 further illustrates the symmetry of the suspension device, the contiguous surface areas between cross-bar 54 and first and second arm end portions 56 and 58.

Typically, magnetic data is written on surface 18 in concentric tracks. In addition to working data, separate tracks of servo data are written for use as part of a servo positioning system. Such a system positions and maintains head 22 centered on a chosen working data track, by carriage movement in response to servo signals. A suspension should allow the head to quickly adjust to minor deviations of the recording surface from its ideal, planar configuration. This calls for high elasticity. As seen from FIGS. 5-7, flexure members 50 and 52 support the assembly 62, and also provide the flexibility for rapid gimbaling action, either by pure bending, torsion, or a combination of bending and torsion.

Each of FIGS. 5-7 schematically illustrates one or more of three deviations in recording surface 18 from its normally horizontal orientation. It should be appreciated that the deviation in each case is shown grossly exaggerated over expected levels, to more clearly illustrate the nature of the deviation and the suspension system response.

In FIG. 5, recording surface 18 is inclined, counter-clockwise as viewed in the figure, from a preferred parallel alignment with the Z axes. Flexure arm end portions 56 and 58, normally in the horizontal plane passing through the center of mass of slider assembly 62, are positioned respectively above and below the plane. Cross-bar 54, responsive to the air bearing force on slider 22, is in parallel alignment with the surface, and the end portions of the flexure arms similarly are parallel with the surface. The opposite ends of the flexure arms near base 48 remain horizontal in their orientation. Thus, it is a lengthwise torsional elastic bending in the flexure arms which permits the adjustment shown. With the center of mass of slider assembly 62 in the plane of the flexure arms, the rotation of the assembly due to flexure arm torsion is about the center of mass.

FIG. 6 schematically illustrates a condition in which the recording surface, though horizontal, is displaced upwardly in the Y direction. Load spring 30 and flexure arms 50 and 52 are temporarily deformed from their horizontal configurations. However, a key difference in the manner of their elastic deformation enhances track following capability. More particularly, load spring 30 deforms in a single curve, as a beam with fixed support at one end and simple support at the other because tip 42 and steel pin 60 are slidable with respect to one another. By contrast, flexure arms 50 and 52 are bent as a beam with a fixed support at both ends, due to the fixed mounting of the flexure arm end portions to cross-bar 54. Because of the cross-bar rigidity, and the high flexure arm flexibility for bending about Z axes, and the fixed cross-bar/flexure arm attachment, the flexure arms assume the S configuration illustrated in the figure. As a result, the air bearing and the counter force of load spring 30 are the primary forces determining the orientation of the slider assembly. The slider assembly maintains the desired parallelism with recording surface 18 and bends the flexure arms, rather than tending to follow the flexure arm bending.

FIG. 7 illustrates two temporary deviations in the recording surface 18: a downward deviation (Y direction), and a counterclockwise tilting away from the preferred parallel alignment with X axes. As was the case with the deviation shown in FIG. 6, flexure arms 50 and 52 respond in a pure elastic bending mode, about Z axis. Again, the flexure arms are constrained to assume an S curve, as the slider assembly is kept parallel to the recording surface by virtue of the load spring and air bearing.

In connection with FIGS. 5-7, it should be understood that the load spring force is substantially vertical.

Moreover, the slider assembly center of mass lies in or close to the flexure arm plane, minimizing fluctuations in the air bearing due to mechanical motion and vibrations of the suspension device or carriage. Every deviation in recording surface 18 can be described in terms of one or more of the above-discussed deviations. The pure bending and lengthwise torsional bending of the flexure arms accommodate every surface irregularity. There is no need for a separate component for gimbaling action.

The result is a simpler, more consistent head suspension, with definite performance advantages. For example, the rectangular configuration of the cross-bar, and base and flexure arms of the foil, (See FIG. 4) is highly resistant to bending about Y axes. Also, the critical flexure arms are nominally flat, with no fabrication bends or curves. The result is substantially improved resistance to lateral off-track (X direction) offset, as well as reduced flying height fluctuations, as compared to conventional gimbal structures. Further, if some lateral offset does occur, the cross-bar/flexure arm connection tends to maintain cross-bar 54 and slider 22 in the desired orientation.

Yet another advantage of the suspension apparatus is that it is not limited to any particular orientation with respect to the direction of disc rotation. Flexure arms 50 and 52 can, if desired, be oriented in another direction, e.g. tangentially rather than radially of the disc. Likewise, the direction of load spring extension is not critical, so long as the spring urges the slider toward the recording surface. Finally, the recording surface orientation can be changed, for example made vertical, without altering the suspension performance.

What is claimed is:

1. A suspension apparatus for supporting a magnetic transducing head with respect to a rigid carriage member for movement relative to a substantially planar magnetic recording surface of a magnetic recording medium and with an air bearing supporting the head in parallel, spaced apart relation to the recording surface, including:

elongate and spaced apart first and second normally planar flexure members, each flexure member mounted to and extended lengthwise away from a rigid carriage and normally disposed parallel to a substantially planar recording surface of a magnetic recording medium;

a substantially rigid cross-member fixed to said first and second flexure members at respective first and second end portions of the flexure members remote from said carriage;

a magnetic transducing head integrally mounted to said cross-member and centrally disposed between said first and second end portions; and a biasing means for urging said cross-member and said transducing head toward said recording surface, while said head is supported in parallel, spaced apart relation to the recording surface by an air bearing formed by movement of said surface relative to said head;

wherein each of said first and second flexure members is disposed with its width dimension parallel to said recording surface and its thickness dimension substantially normal to the recording surface, the width of each flexure member being substantially greater than its thickness whereby each flexure member is subject to lengthwise torsional bending and highly compliant for elastic deformation about axes parallel to its width whereby the orientation of the transducing head and cross-member are determined primarily by said biasing means and said air bearing, with said flexure members being so deformed in accordance with said orientation; and wherein each said flexure member is substantially resistant to elastic bending about axes normal to said recording surface.

2. The suspension apparatus of claim 1 wherein:
said flexure members comprise first and second support arms parallel to one another, and said cross-member comprises an elongate cross-bar disposed transversely of the arms.

3. The suspension apparatus of claim 2 wherein:
the length of each of said flexure members is at least one hundred times its thickness, and the width of each flexure member is at least twenty times its thickness.

4. The suspension apparatus of claim 3 wherein:
said length is at least two hundred times said thickness, and said width is at least forty times the thickness.

5. The suspension apparatus of claim 2 wherein:
said cross-bar is normally disposed with its width parallel to said recording surface, and its thickness substantially normal to the recording surface, and the thickness of said cross-member is at least three times the thickness of each of said flexure members.

6. The suspension apparatus of claim 5 wherein:
the thickness of said cross-member is at least seven times the thickness of each of said flexure members.

7. The apparatus of claim 2 wherein:
said flexure members are constructed of a first material and said cross-bar is constructed of a second material, with said second material having a stiffness/mass ratio greater than the stiffness/mass ratio of the first material.

8. The suspension apparatus of claim 7 wherein:
the stiffness/mass ratio for said second material is at least four times the corresponding ratio for said first material.

9. The suspension apparatus of claim 8 wherein:
said first material consists of a high yield strength spring steel, and said second material consists of a structural ceramic.

10. The suspension apparatus of claim 2 wherein:
said first and second support arms comprise a portion of a single foil of a high yield strength spring steel, said foil further including a substantially planar base portion mounted with respect to said carriage, said arms extended from said base portion.

11. The suspension apparatus of claim 10 further including:
a substantially rigid mounting plate fixed with respect to said carriage and having opposed planar side surfaces parallel to said recording surface, for supporting said foil and said biasing means, respectively, said mounting plate having a convex surface between said side surfaces and facing away from said carriage.

12. The suspension apparatus of claim 11 wherein:
said biasing means comprises a normally curved load arm configured to store a selected preloading force when elastically deformed into a planar configuration, said load arm including a load arm base fixed to one of said side surfaces and a tip portion positioned to contact a slider assembly comprising said head and said cross-bar; and wherein the distance between said side surfaces, comprising the thickness of said mounting plate, is substantially equal to the distance from the center of mass of said slider assembly to the point of the assembly contacting said tip portion.

13. The suspension assembly of claim 12 further including:
a substantially rigid spacer member, mounted between said carriage and said mounting plate, for positioning said mounting plate a selected distance from the carriage.

14. The suspension apparatus of claim 2 wherein:
said first and second flexure members are parallel to one another and are disposed in a flexure plane parallel to said recording surface, and wherein a slider assembly including said cross-bar and said transducing head has a center of mass positioned at least proximate said flexure plane.

15. The suspension apparatus of claim 14 wherein: said biasing means comprises an elongate load spring mounted with respect to said carriage and extended away from said carriage normally parallel to said flexure members when said transducing head is so supported by said air bearing.

16. The suspension apparatus of claim 15 further including:
a load receiving member fixed to said cross-bars and having a generally hemispherical surface in contact with said load spring to transmit force from the load spring to the cross-bar.

17. The suspension apparatus of claim 16 wherein:
said load spring is normally curved, and preloaded to a selected force when elastically deformed into a substantially planar configuration, said load spring normally being maintained in said planar configuration to provide said selected force to said slider assembly through said load receiving, member.

* * * * *